Jan. 5, 1943.   C. BIRD   2,307,195
PISTON RING APPLICATOR
Filed July 30, 1942
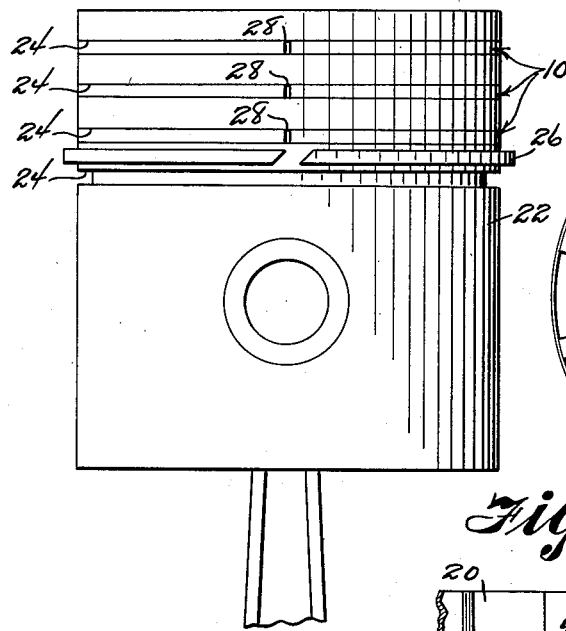
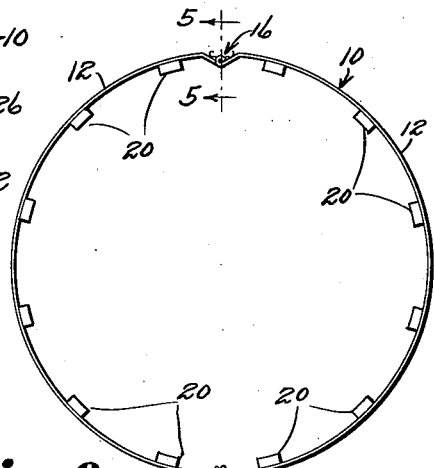
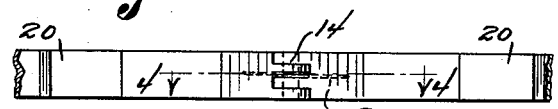
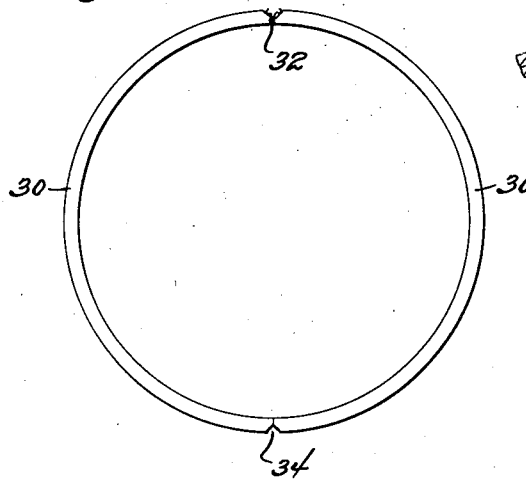
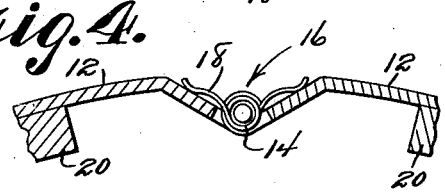
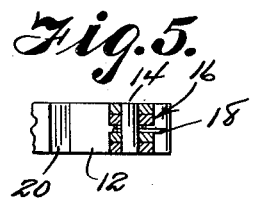
Clay Bird
INVENTOR.
BY
Victor J. Evans & Co.
ATTORNEYS Patented Jan. 5, 1943

2,307,195

UNITED STATES PATENT OFFICE 2,307,195

PISTON RING APPLICATOR

Clay Bird, New London, Conn.

Application July 30, 1942, Serial No. 452,957

6 Claims. (Cl. 29—86.4)

My invention relates to the application of piston rings to pistons of the internal combustion engine type and the like, and has among its objects and advantages the provision of an improved application device facilitating the installation of the piston rings in such manner as to eliminate breakage of the rings as well as bending the rings out of round.

In the accompanying drawing:

Figure 1 is an elevational view of a piston illustrating my invention applied thereto;

Figure 2 is an end view of the invention;

Figure 3 is a fragmentary view illustrating a hinge;

Figure 4 is a sectional view along the line 4—4 of Figure 3;

Figure 5 is an enlarged sectional view along the line 5—5 of Figure 2; and

Figure 6 is an end view of a modified form of the invention.

In the embodiment selected for illustration, Figure 2 illustrates a ring 10 made up of sections 12 hingedly connected together at 14. The sections 12 are bent to provide a depression 16 at the hinged joint to bring the hinge structure within the outside contour of the ring 12. A spring 18 is incorporated in the hinge structure to yieldingly urge the sections 12 to their normal positions of Figure 2. A plurality of piston-engaging projections 20 extend inwardly from the inner faces of the sections 12. The ring 10 is preferably of an outside diameter ten thousandths to fifteen thousandths of an inch smaller than the outside diameter of the piston 22.

In operation, rings 10 are inserted in all the piston ring grooves 24 except one. A piston ring 26 is then inserted over the end of the piston 22 and moved inwardly thereof for reception in the unoccupied groove 24. After installing the piston ring 26 in the first unoccupied groove 24, the next ring 10 is removed from its groove 24 and the second piston ring slipped into place.

The spring 18 holds the ring firmly against the bottom face of the piston ring groove, and the ring 10 functions as a filler which permits the piston ring to slide easily into place. This eliminates injurious bending of the piston ring and much breakage. The ring is easily removed from the piston groove by reason of a gap 28 formed by inward bending of the unhinged ends of the sections 12.

Figure 6 illustrates a modification in that the ring sections 30 are of such thickness as to have engagement with the bottom face of the piston ring groove. However, the sections 30 are hinged at 32 and formed with a finger gap 34 to facilitate removal.

Without further elaboration, the foregoing will so fully illustrate my invention, that others may, by applying current knowledge, readily adapt the same for use under various conditions of service.

I claim:

1. An application tool for piston rings mounted in grooves in an engine piston comprising a filler ring made up of hingedly connected sections, said sections coacting to provide a filler for a groove in the piston to facilitate movement of the piston ring across the groove occupied by the sections for placement in an unoccupied groove.

2. An application tool for piston rings mounted in grooves in an engine piston comprising a filler ring made up of hingedly connected sections, said sections coacting to provide a filler for a groove in the piston to facilitate movement of the piston ring across the groove occupied by the sections for placement in an unoccupied groove, and resilient means acting on said sections to yieldingly hold the latter in contact with the bottom face of the piston ring groove.

3. The invention described in claim 1 wherein said sections are provided with inwardly extending projections engageable with the bottom face of the piston ring groove.

4. The invention described in claim 1 wherein said sections are of such thickness as to have positional engagement with the bottom face of the piston ring groove.

5. The invention described in claim 1 wherein said sections are engageable with the bottom face of the piston ring groove and defining an outside diameter slightly less than the diameter of the piston.

6. The invention described in claim 1 wherein said sections are shaped to provide an exterior cavity, a pin means hingedly connecting the sections at the bottom of said cavity, and a spring mounted on said pin and acting on said sections to yieldingly press the latter into engagement with the bottom face of the ring groove of the piston.

CLAY BIRD.